(12) United States Patent
Lee et al.

(10) Patent No.: US 9,973,740 B2
(45) Date of Patent: May 15, 2018

(54) METHOD AND APPARATUS FOR ENCODING THREE-DIMENSIONAL (3D) CONTENT

(71) Applicant: Electronics and Telecommunications Research Institute, Daejeon (KR)

(72) Inventors: Jin Young Lee, Daejeon (KR); Nam Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 184 days.

(21) Appl. No.: 14/906,994

(22) PCT Filed: Jul. 24, 2014

(86) PCT No.: PCT/KR2014/006728
§ 371 (c)(1),
(2) Date: Jan. 22, 2016

(87) PCT Pub. No.: WO2015/012605
PCT Pub. Date: Jan. 29, 2015

(65) Prior Publication Data
US 2016/0165210 A1    Jun. 9, 2016

(30) Foreign Application Priority Data

Jul. 24, 2013 (KR) .................. 10-2013-0087325
Jul. 22, 2014 (KR) .................. 10-2014-0092615

(51) Int. Cl.
*H04N 15/00* (2006.01)
*H04N 5/92* (2006.01)
(Continued)

(52) U.S. Cl.
CPC ..... *H04N 13/0048* (2013.01); *H04N 13/0022* (2013.01); *H04N 19/136* (2014.11);
(Continued)

(58) Field of Classification Search
CPC .... H04N 19/597; H04N 19/46; H04N 19/105; H04N 19/172; H04N 19/96; H04N 19/136; H04N 13/0003
(Continued)

(56) References Cited

U.S. PATENT DOCUMENTS

2012/0229602 A1    9/2012    Chen et al.
2013/0135431 A1    5/2013    Chen et al.
(Continued)

FOREIGN PATENT DOCUMENTS

KR    10-2012-0106631 A    9/2012
KR    10-2013-0018629 A    2/2013
(Continued)

OTHER PUBLICATIONS

"Information Technology—Dynamic Adaptive Streaming Over HTTP (DASH)—Part 1: Media Presentation Description and Segment Formats," ISO/IEC/ JTC 1/SC 29, Jan. 5, 2012 (133 pages).
(Continued)

*Primary Examiner* — Robert Chevalier
(74) *Attorney, Agent, or Firm* — NSIP Law (57) ABSTRACT

Disclosed is a method of encoding three-dimensional (3D) content. The method of encoding 3D content according to an embodiment may include setting a dependency between texture information and depth information of the 3D content, and generating a bitstream comprising the dependency.

11 Claims, 4 Drawing Sheets

(51) Int. Cl.
    *H04N 13/00*     (2018.01)
    *H04N 21/81*     (2011.01)
    *H04N 19/597*     (2014.01)
    *H04N 19/136*     (2014.01)
    *H04N 19/70*     (2014.01)
    *H04N 21/845*     (2011.01)
    *H04N 21/854*     (2011.01)

(52) U.S. Cl.
    CPC ........... *H04N 19/597* (2014.11); *H04N 19/70* (2014.11); *H04N 21/816* (2013.01); *H04N 21/8456* (2013.01); *H04N 21/85406* (2013.01); *H04N 2013/0081* (2013.01)

(58) Field of Classification Search
    USPC ....................... 386/43, 42, 46, 326, 328, 329
    See application file for complete search history.

(56) References Cited

U.S. PATENT DOCUMENTS

| | | |
|---|---|---|
| 2013/0176389 A1 | 7/2013 | Chen et al. |
| 2015/0195572 A1* | 7/2015 | Chen .................... H04N 19/517 375/240.16 |
| 2016/0134874 A1* | 5/2016 | Konieczny ........... H04N 19/597 375/240.08 |
| 2016/0345007 A1* | 11/2016 | Jaeger ....................... G06T 9/20 |

FOREIGN PATENT DOCUMENTS

| | | |
|---|---|---|
| KR | 10-2013-0050722 A | 5/2013 |
| WO | WO 2013/077670 A1 | 5/2012 |
| WO | WO 2012/171477 A1 | 12/2012 |

OTHER PUBLICATIONS

Rusanovskyy, D., et al., "3D-AVC Test Model 6", 4th Meeting of Joint Collaborative Team on 3D Video Coding Extension Development of ITU-T SG 16 WP 3 and ISO/IEC JTC 1/SC 29/WG 11, held in Incheon Korea on Apr. 20-26, 2013 (39 pages).

Thang, T., et al., "Improved Relations for Advanced Media Components", ETRI, University of Aizu, ISO/IEC/JTC1/SC29/WG11 MPEG2013/M30274, Vienna, Austria, Aug. 2013 (5 pages).

International Search Report dated Oct. 22, 2014, in counterpart International Application No. PCT/KR2014/006728 (2 pages in English, 2 pages in Korean).

* cited by examiner

Representation 1

Texture

Representation 2

Depth

Representation 3

Texture

Depth

METHOD AND APPARATUS FOR ENCODING THREE-DIMENSIONAL (3D) CONTENT

CROSS-REFERENCE TO RELATED APPLICATIONS

This application is a National Stage of International Application No. PCT/KR2014/006728, filed Jul. 24, 2014 and published as WO 2015/012605 on Jan. 29, 2015, which claims the benefit of Korean Application No. 10-2013-0087325, filed on Jul. 24, 2013 and Korean Application No. 10-2014-0092615, filed on Jul. 22, 2014, the entire disclosures of which are incorporated herein by reference for all purposes.

TECHNICAL FIELD

Embodiments of the present invention relate to technology for providing streaming content, and more particularly, to technology for providing three-dimensional (3D) content.

BACKGROUND ART

Streaming is one of methods used to transmit and play back multimedia content such as a sound and a moving picture. A client may receive content through a streaming service and may play back the content at the same time.

An adaptive streaming service indicates providing a streaming service through a communication method including a request of a client and a response of the server to the request of the client.

The client may request a media sequence appropriate for an environment of the client, for example, a transmission channel of the client through the adaptive streaming service. The server may provide a media sequence appropriate for the request of the client among media sequences with various qualities.

The adaptive streaming service may be provided based on a variety of protocols. A hypertext transfer protocol (HTTP) adaptive streaming service indicates an adaptive streaming service provided based on an HTTP. A client of the HTTP adaptive streaming service may be provided with content from a server using the HTTP, and may transmit a request associated with a streaming service to the server.

A motion picture experts group (MPEG) DASH standard has been developed to meet the substantial requirements of media transmission. In addition, the development of content representing a three dimension (3D) is currently activated. The MPEG DASH standard has supported a format such as an MVC and an SVC to develop and transmit the 3D content.

A current MPEG DASH is under development to be capable of supporting a new format such as high efficiency video coding (HEVC) and 3DV. There is a need for developing technology capable of further efficiently transmitting 3D content.

DISCLOSURE OF INVENTION

Technical Goals

The present disclosure is conceived to meet a request for developing such technology, and provides a method and apparatus that may support a flexible screen formation of three-dimensional (3D) content.

Technical Solutions

According to an embodiment, there is provided a method of encoding three-dimensional (3D) content, the method including: setting a dependency between texture information and depth information of the 3D content; and generating a bitstream including the dependency.

The 3D content encoding method may further include setting a relationship between a given view and the depth information and a dependency between the depth information and a texture information when the depth information is separate from the texture information.

Alternatively, the 3D content encoding method may further include setting at least one representation for a texture information and depth information of each view.

The representation may include the texture information, may include the depth information, or may include both the texture information and the depth information.

In this case, the 3D content encoding method may further include setting an identifier parameter indicating information included in the representation.

When the identifier has a form of "ti", the representation may include texture information of a view i. When the identifier has a form of "di", the representation may include depth information of the view i. When the identifier has a form of "vi", the representation may include the texture information and the depth information of the view i.

Alternatively, the 3D content encoding method may further include setting a dependency parameter indicating a relationship between a view associated with a current adaptive set and texture and depth information.

The identifier parameter or the dependency parameter may be added to a multi-view design of a role element of a moving picture experts group (MPEG) dynamic adaptive streaming over HTTP (DASH) standard.

The dependency may be set at a representation level or an adaptive set level. According to another embodiment, there is provided a method of encoding 3D content, the method including: setting a representation including at least one of texture information and depth information; and generating a bitstream corresponding to the representation.

Effects of the Invention

According to embodiments, there may be provided a method and apparatus that may support a flexible screen formation of three-dimensional (3D) content.

In particular, it is possible to support a further flexible screen formation by setting a dependency between a texture and a depth.

In addition, it is possible to guarantee the compatibility with existing technology by providing a method that meets the requirements of existing motion picture experts group (MPEG) dynamic adaptive streaming over HTTP (DASH).

BEST MODE FOR CARRYING OUT THE INVENTION

Hereinafter, embodiments of the present invention will be described with reference to the accompanying drawings. However, the present invention is not limited thereto or restricted thereby. Like reference numerals illustrated in the drawings refer to like constituent elements throughout.

In the following, the term "specify" may be used as the same meaning as the term "indicate" or "mean". Also, the terms "uniform resource locator (URL)" and "uniform resource identifier (URI)" may be used as the same meaning and may be interchangeably used.

When an index of a predetermined element is "1" to "N" or "0" to "N", the element may be counted to be one or more. N may indicate an integer greater than or equal to "0".

Hereinafter, examples of terms used in the embodiments will be described.

A dynamic adaptive streaming over hypertext transfer protocol (HTTP) (DASH) may 1) transfer media content from a standard HTTP server to an HTTP client, and may 2) specify formats enabling caching of content through standard HTTP caches. The format may be an extensible markup language (XML) format or a binary format.

Media content may be a single media content period or contiguous sequence of media content periods. In the following, the terms "media content", "media", and "content" may be used as the same meaning. The media content may be a set of media content components having a common timeline such as a video, an audio, and a subtitle, for example. Also, media components may have relationships as to how the media components are individually, jointly, or mutually exclusively present as a program or a movie. The media content may be content according to a request or live content.

Content may be divided into at least one interval. That is, the content may include at least one interval. Hereinafter, the terms "interval" and "period" may be used as the same meaning. In particular, the period may be a term used in third generation partnership project (3GPP) adaptive HTTP streaming. The period may be an interval of a media presentation. Contiguous sequence of all periods may constitute a media presentation.

At least one interval may be a basic unit and may be described by signaling metadata. That is, metadata may describe each of the at least one interval. The metadata may refer to a media presentation description (MPD), which will be described later.

A media content component may be a contiguous component of media content having an assigned media component type. The media content component may be encoded to an individual media stream. A media component may be an encoded version of individual media types, such as an audio, a video, or a timed text having a predetermined attributes, for example, a bandwidth, a language, and a resolution.

A media stream may be an encoded version of a media content component.

A media component type may be a single type of media content, such as an audio, a video, or a text.

A media presentation may be a collection of data used to establish a bounded or unbounded presentation of media content. The media presentation may be a collection of data accessible by a client of DASH to provide a streaming service to a user.

A media presentation description (MPD) may be a formalized description of a media presentation to provide a streaming service. The MPD may be a document including metadata requested by a client of DASH in order to construct an HTTP-URL and to provide a streaming service to a user. The media presentation may include possible updates of the MPD and may be described by the MPD.

The MPD may be a document including metadata that is requested a DASH client for in order to construct appropriate HTTP-URLs to 1) access segments and to 2) provide a streaming service to a user. HTTP-URLs may be absolute or relative. The MPD may be an XML-document.

The MPD may define a format to inform resource identifiers for a segment. The MPD may provide a context for resources identified within a media presentation. Resource identifiers may be HTTP-URLs. URLs may be limited by a byte range attribute.

A period may be an interval of a media presentation. Continuous sequence of all periods may constitute a media presentation. That is, the media presentation may include at least one interval. Alternatively, the media presentation may be configured as at least one period.

A representation may be a collection and an encapsulation of at least one media stream provided in a delivery format. The representation may be a structured collection of at least one media content component within a single period. That is, the representation may be one of alternative choices of a complete set or a subset of media content components constituting media content during a defined period. The representation may include at least one media stream.

The representation may start at a start point of a period, that is, a period including the representation, and may continue by an end point of the period.

The representation may be one of alternative choices of media content or a subset of the media content having a different encoding choice such as a bitrate, a resolution, a language, and a codec, for example.

An MPD or an MPD element may provide descriptive information that enables a client to select at least one representation.

Hereinafter, the terms "representation" and "media representation" may be used as the same meaning and thus, interchangeably used.

Sets of at least two segments corresponding to a single interval may be present. A set of at least two segments may be referred to as a representation or an alternative.

A segment may be a minimum accessible unit within an MPD having a defined format. Hereinafter, the terms "segment" and "media segment" may be used as the same meaning and thus, interchangeably used.

Each interval may be divided into segments. Hereinafter, the terms "segment" and "fragment" may be used as the same meaning and thus, interchangeably used. The segment may be a term of 3GPP adaptive HTTP streaming. The segment may indicate an entity body of a response to an HTTP/1.1 GET request for an HTTP-URL defined in, for example, RFC 2616 (or a GET request for a portion indicated by a byte range).

A terminal may play back media content using received bytes, that is, segment.

A sub-segment may indicate a smallest unit within segments indexed using a segment index at a segment level.

A sub-representation may be a portion of a representation described within an MPD played over the entire period.

A random access point (RAP) indicates a predetermined location within a media segment. The RAP is identified as a location at which a playback may resume from a location of the RAP using only information included in a media segment.

A dynamic adaptive streaming over HTTP (DASH) may provide a media streaming model for transfer of media content. A client may exclusively control a session of the transfer. The client may request a web server of a standard not having unique functions of DASH for data using an HTTP. Accordingly, the DASH standard may be focused on a data format used to provide a DASH media presentation.

A collection of transferable encoded versions of media content and an appropriate description as to the versions may constitute a media presentation. Media content may include at least one media content period contiguous over time. Each media content period may include at least one media content component. For example, audio components in a variety of languages and a video component may be an example of at least one media content component. A media content component type may be assigned to each media content component. An audio or a video may be used as an example of the media content component type.

Each media content component may have at least one encoded version. An encoded version of a media content component may be referred to as a media stream. Each media stream may inherit an attribute of media content used for encoding media content, a media content period or a media stream. Also, the media stream may be assigned with an attribute of an encoding process, such as sub-sampling, a codec parameter, and an encoding bitrate, for example. Accordingly, metadata may vary in response to a static or dynamic selection on media content components and media streams.

Figure 1:
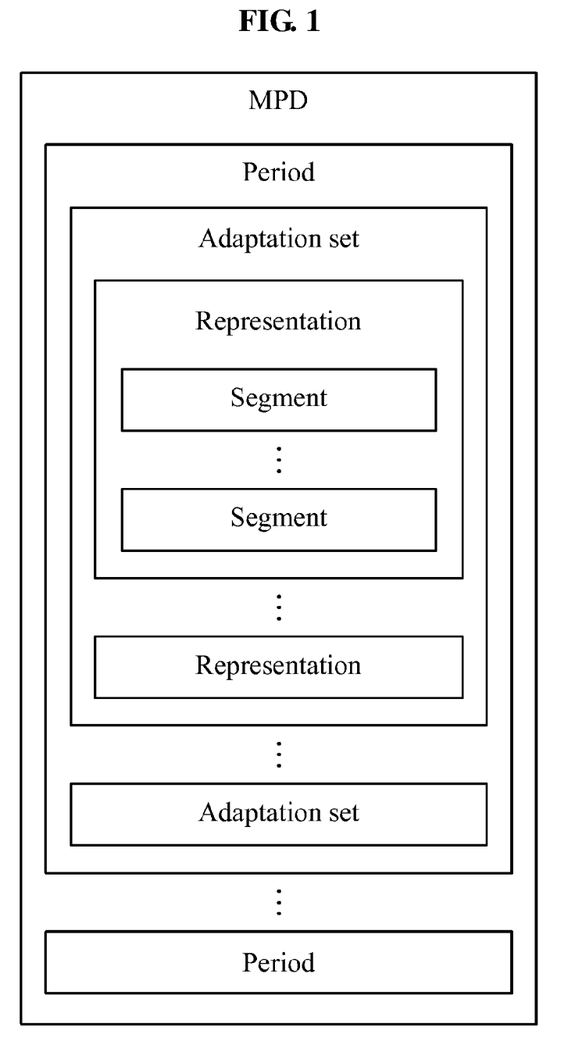
FIG. 1 illustrates a high-level data model of dynamic adaptive streaming over HTTP (DASH).

FIG. 1 illustrates a high-level data model of DASH.

The DASH may be based on a hierarchical data model as illustrated in FIG. 1.

A DASH media presentation may be described by an MPD document. An MPD may describe sequence of periods over time. The sequence of periods may generate a media presentation. In general, a period may indicate a media content period during which a consistent set of encoded versions of media content is available. That is, during a single period, bitrates, a language, a caption, and a subtitle may not vary.

A period may include at least one adaptation set. An adaptation set may indicate a set of replaceable encoded versions of at least one media component. For example, a single adaptation set may be present for a primary video component, and a separate single adaptation set may be present for a primary audio component. For example, when another available material such as a caption and an audio description is present, the other available material may have a separate adaptation set.

An adaptation set may include at least one representation. A representation may describe a transferable encoded version of at least one media content component. The representation may include at least one media stream. A predetermined single representation within the adaptation set may be sufficient to render included media content components. In general, a client may switch from a single representation to another representation to adapt to a network condition or other factors within a single period. The client may ignore a representation depending on a codec not supported by the client or inappropriate due to other reasons, or other rendering technologies.

Content may be divided into segments over time within a representation. That is, the representation may include at least one segment. A segment may be a basic unit of data included in an MPD. A URL of each segment may be provided. That a URL of a segment is provided may indicate that the segment is a maximum unit of data retrieval in response to a single HTTP request. Meanwhile, the MPD may include a URL and a byte range of the URL. Accordingly, the segment may be included in a byte range of another larger resource.

Hereinafter, a relationship between constituent elements of the foregoing data model will be described.

An MPD may include sequence of at least one period.

Each period may include at least one adaptation set. When an adaptation set includes at least one media content component, each media content component may be individually defined.

Each adaptation set may include at least one representation.

Each representation may include at least one sub-representation.

Each representation may include at least one segment.

A segment may include media data to access, decode, and play back media content including media data and/or the segment.

An adaptation set, a representation, and a sub-representation may share a common attribute and element.

Each segment may include at least one sub-segment.

An MPD document indicating an MPD may include an MPD element.

An adaptation set may include at least one media content component. Properties of each media content component may be described by a "ContentComponent" element. When a single media content component is present within an adaptation set, properties of the media content component may be directly described by an "AdaptationSet" element.

Hereinafter, semantic of the "ContentComponent" element will be described.

1) The "ContentComponent" element may have attributes as follow:

An "id" attribute may specify an identifier of a media component. The "id" attribute may be unique within the range of an adaptation set.

A "lang" attribute may specify a language code(s) of a media content component. Syntax and semantic according to International Engineering Task Force (IETF) request for comments (RFC) 5646 may be employed.

A "contentType" attribute may specify a type of a media content component. A value of "type" that is a top-level content type may be defined in RFC1521.

A "par" attribute may specify a picture aspect ratio. The "par" attribute may include two integers. When the "par" attribute is present, a "width" attribute and a "height" attribute of representations may also be present.

2) The "ContentComponent" element may have elements as follows:

An "Accessibility" element may have an index of "0" to "N", and may specify information about an accessibility scheme.

A "Role" element may have an index of "0" to "N", and may specify information about a role annotation scheme.

A "Rating" element may have an index of "0" to "N", and may specify information about a rating scheme.

A "Viewpoint" element may have an index of "0" to "N", and may specify information about a viewpoint annotation scheme.

Meanwhile, 3D content may be described based on an AVC based format, an MVC based formation, or a high efficiency video coding (HEVC) based format. The 3D content may include depth information for representing a 3D image.

Each period may include at least one adaptation set. An adaptation set may be described by an "AdaptationSet" element included in a "Period" element.

An adaptation set may include alternative encodings of at least one media component. Each alternative encoding may be included in a representation. At least one representation included in a single adaptation set may indicate the same media content component, and may include at least one media stream perceptually regarded to be the same.

At least one representation may be arranged within an adaptation set based on media content component properties present within the at least one representation. The media content component proprieties may include 1) a language described by the "lang" attribute, 2) a media content type described by the "contentType" attribute, 3) a picture aspect ratio described by the "par" attribute, 4) a role property described by the "Role" element, 5) an accessibility property described by the "Accessibility" element, 6) a viewpoint property described by the "ViewPoint" element, and 7) a rating attribute described by the "Rating" element.

The "AdaptationSet" element may include default values of elements and attributes associated with at least one representation included in an adaptation set. Hereinafter, a list of elements and attributes commonly present in the "AdaptationSet" element and the "Representation" element will be described.

The "Adaptation" element may support a description of a range as to a "bandwidth" attribute, a "width" attribute, a "height" attribute, and a "frame rate" attribute associated with at least one representation included in the adaptation set. The description may provide a summary of all values of at least one representation included in the adaptation set. The at least one representation included in the adaptation set may not have a value beyond the range defined within the adaptation set.

The adaptation set may be classified into groups using a group attribute.

Hereinafter, the semantic of the "AdaptationSet" element will be described.

1) The "AdaptationSet" element may have attributes as follows:

An "xlink:href" attribute may specify reference to an outside "AdaptationSet" element.

An "xlink:actuate" attribute may specify processing commands A value of a "link:actuate" attribute may be "onload" or "onRequest".

An "id" attribute may specify an identifier of an adaptation set within the range of a period. The "id" attribute may be a unique identifier within the range including the period. The "id" attribute may be a member within a remote element.

A "group" attribute may be an identifier of a group, which is unique within the range of a period.

A "lang" attribute may specify a language code(s) of an adaptation set. Syntax and semantics according to IETF RFC 5646 may be employed.

A "contentType" attribute may specify a media content component type of an adaptation set. A value of "type" that is a top-level content type may be defined in RFC1521.

A "par" attribute may specify a picture aspect ratio. The "par" attribute may include two integers. When the par attribute is present, a "width" attribute and a "height" attribute of representations may also be present.

A "minBandWidth" attribute may specify a minimum bandwidth attribute value of all representations within an adaptation set.

A "maxBandWidth" attribute may specify a maximum bandwidth attribute value of all representations within an adaptation set.

A "minWidth" attribute may specify a minimum width attribute value of all representations within an adaptation set.

A "maxWidth" attribute may specify a maximum width attribute value of all representations within an adaptation set.

A "minHeight" attribute may specify a minimum height attribute value of all representations within an adaptation set.

A "maxHeight" attribute may specify a maximum height attribute value of all representations within an adaptation set.

A "minFrameRate" attribute may specify a minimum frameRate attribute value of all representations within an adaptation set.

A "maxFrameRate" attribute may specify a maximum frameRate attribute value of all representations within an adaptation set.

2) The "AdaptationSet" element may have elements as follows:

An "Accessibility" element may have an index of "0" to "N", and may specify information about an accessibility scheme.

A "Role" element may have an index of "0" to "N", and may specify information about a role annotation scheme.

A "Rating" element may have an index of "0" to "N", and may specify information about a rating scheme.

A "Viewpoint" element may have an index of "0" to "N", and may specify information about a viewpoint annotation scheme.

A "ContentComponent" element may have an index of "0" to "N", and may specify properties of a media content component included in an adaptation set.

A "BaseURL" element may have an index of "0" to "N", and may be used to select a reference solution and an alternative URL.

A "Representation" element may have an index of "0" to "N", and may specify a representation. At least one representation element may be present within each adaptation set. The "Representation" element may be a portion of a remote element.

Figure 2:
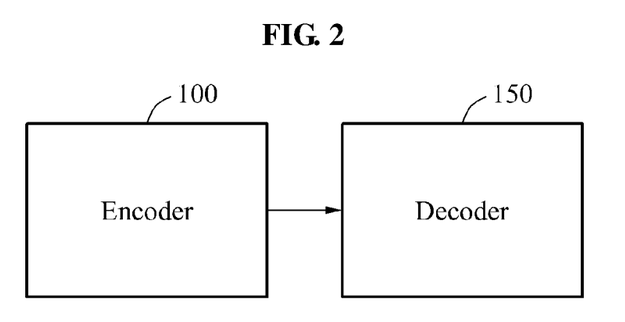
FIG. 2 is a block diagram illustrating an encoder and a decoder of a three-dimensional (3D) format according to an embodiment.

FIG. 2 is a block diagram illustrating an encoder and a decoder of a 3D format according to an embodiment.

Referring to FIG. 2, an encoder 100 may encode 3D content and may transmit the encoded 3D content to a decoder 100. The encoder 100 may generate and transmit a bitstream by performing encoding.

The decoder 100 may decode the received encoded content. The content decoded by the decoder 100 may be played back.

The encoder 100 may set a dependency between a texture and a depth. Here, the dependency between the texture and the depth may be adjusted through a configuration and a layer. A setting may include a 3D high setting or a 3D extended high setting. The layer may include a base view or an enhanced view.

The encoder 100 may encode a single view bitstream. Alternatively, the encoder 100 may encode a multi-view bitstream.

Meanwhile, the encoder 100 may set the dependency between the texture and the depth. The encoder 100 may set the dependency between the texture and the depth in terms of a single view, or may set the dependency between the texture and the depth in terms of a multi-view.

The encoder 100 may also support an adaptivity for a 3DV standard by adjusting the quality of the texture and the depth.

When depth information is separate from a texture, the encoder 100 may describe an association between a given view and depth data and a dependency between a stream of the texture and the depth data.

Although depth data and a texture of a single view are combined within a representation, a dependency between the depth data and data of another view of the texture data is to be described.

A bitstream or a representation encoded by the encoder 100 may have the following characteristics.
- At least one representation may be present with respect to texture data and depth data of each view.
- A representation may be a representation having only texture data, a representation having only depth data, or a representation having both the texture data and the depth data.
- Representations within a single adaptation set have the same component. That is, representations within a single adaptation set may be provided in the same form of having only texture data, having only depth data, or having both the texture data and the depth data.
- A dependency of a texture, a depth, and a view may be described at an adaptation set level as well as a representation level.

In particular, "urn:mpeg:dash:stereoid2013" may be added to a multi-view design of a role element of DASH. Parameters present in the multi-view design may be added to Table 1.

TABLE 1

| Parameter | Description |
| --- | --- |
| id (optional) | 1) When a parameter has a "ti" form, the parameter indicates a texture of a view i. Here, i denotes not a negative number but a decimal integer. A parameter in this form includes only texture information associated with a view in a representation. 2) When a parameter has a "di" form, the parameter indicates a depth of the view i. i denotes not a negative number but a decimal integer. A parameter in this form includes only depth information associated with a view in a representation. 3) When a parameter has a "vi" form, the parameter indicates a view of a view i. i denotes not a negative number but a decimal integer. The parameter in this form includes texture information and depth information associated with a view in a representation. |
| depend (optional) | This parameter recites a viewpoint and texture and/or depth information associated with a current adaptation set in a form of ("vk", ; ti" and/or "dj") without spacing. Here, vk, ti, and dj denote not a negative number but a decimal integer. |

Figure 3:
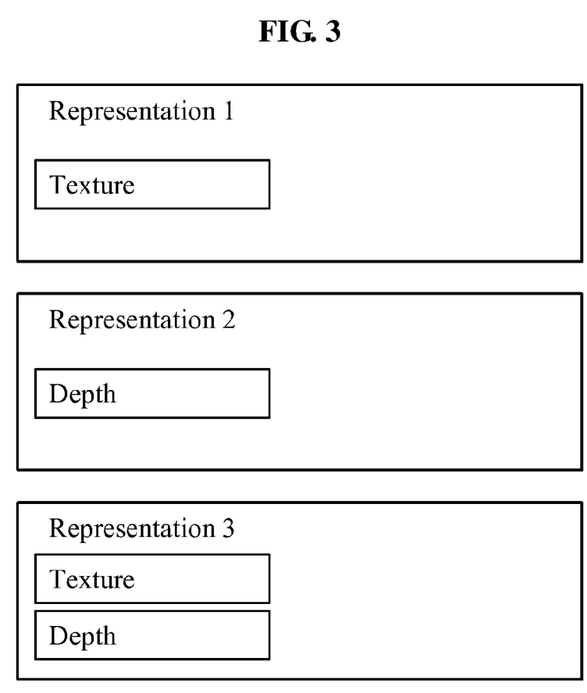
FIG. 3 illustrates examples of a representation according to a variety of embodiments.

As described above, the encoder 100 may generate a representation including only texture information, a representation including only depth information, or a representation including both the texture information and the depth information by setting at least one of the "id" parameter and the "depend" parameter. Referring to FIG. 3, a first representation may include only texture information, a second representation may include only depth information, and a third representation may include both the texture information and the depth information. The first through third representations may be included in a single adaptation set.

The decoder 150 may determine whether a view of a bitstream is a single view or a multi-view, and may perform decoding.

The decoder 150 may determine whether a representation includes only texture information, includes only depth information, or includes both the texture information and the depth information. For example, the decoder 150 may verify information included in a representation based on the "id" parameter of the role element.

The decoder 150 may perform adaptive decoding based on whether a view of a bitstream is a single view or a multi-view, and whether a representation includes only texture information, includes only depth information, or includes both the texture information and the depth information.

The decoder 150 may also perform decoding based on a dependency between a texture within the bitstream and at least one of a depth and a view. In this case, the decoder 150 may verify the dependency at a representation level or an adaptation set level and may perform decoding.

Figure 4:
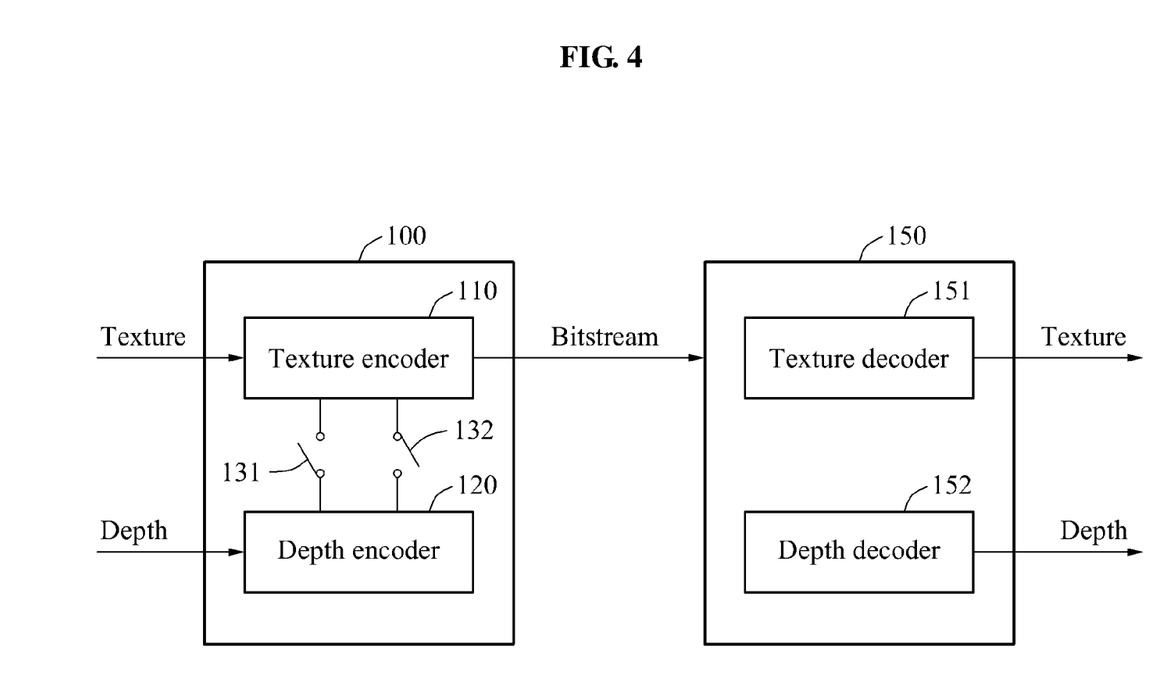
FIG. 4 is a block diagram illustrating an encoder and a decoder according to an embodiment.

FIG. 4 is a block diagram illustrating an encoder and a decoder according to an embodiment.

The encoder 100 may include a texture encoder 110 and a depth encoder 120. The encoder 100 may include a first switch 131 and a second switch 132.

The texture encoder 110 may receive and encode texture data, and the depth encoder 120 may receive and encode depth information. The first switch 131 and the second switch 132 may be controlled to be in an ON-state or in an OFF state based on whether a setting is a 3D high setting or a 3D extended high setting. For example, in the 3D high setting, the first switch 131 and the second switch 132 may be switched OFF. In addition, in the 3D extended high setting, the first switch 131 and the second switch 132 may be switched ON.

The decoder 150 may include a texture decoder 151 and a depth decoder 152. As described above, the decoder 150 may determine whether a view of a bitstream is a single view or a multi-view, and may perform decoding.

The decoder 150 may determine whether a representation includes only texture information, includes only depth information, or includes both the texture information and the depth information. For example, the decoder 150 may verify information included in a representation based on the "id" parameter of the role element.

The decoder 150 may perform adaptive decoding based on whether a view of a bitstream is a single view or a multi-view, and whether a representation includes only texture information, includes only depth information, or includes both the texture information and the depth information.

The decoder 150 may also perform decoding based on a dependency between a texture within the bitstream and at least one of a depth and a view. In this case, the decoder 150 may verify the dependency at a representation level or an adaptation set level and may perform decoding. The decoder 150 may perform decoding by driving at least one of the texture decoder 151 and the depth decoder 152 based on various results of determining.

Hereinafter, various modified embodiments of 3DV including depth information will be described.

First Embodiment

The first embodiment describes a single view and depth information in each adaptation set. Each media component, that is, a texture and depth may have two representations. The following description relates to the first embodiment.

```
<MPD>
    <Period duration="PT1256.00S">
<SegmentList>
    <Initialization sourceURL="seg-m-init-2.mp4"/>
</SegmentList>
<!-- Below a single view texture with two representations -->
            <AdaptationSet mimeType="video/mp4"
                codecs="avc1.640828">
    <Role schemeIdUri="urn:mpeg:dash:stereoid:2013" id="t0"/>
    <Representation id="C2" bandwidth="128000">
        <SegmentList duration="10">
            <SegmentURL media="seg-m1-C2view-201.mp4"/>
            <SegmentURL media="seg-m1-C2view-202.mp4"/>
        </SegmentList>
    </Representation>
    <Representation id="C1" bandwidth="192000">
        <SegmentList duration="10">
            <SegmentURL media="seg-m1-C1view-201.mp4"/>
            <SegmentURL media="seg-m1-C1view-202.mp4"/>
        </SegmentList>
    </Representation>
</AdaptationSet>
            <!-And below is the depth data associated with
            the above view texture -->
<AdaptationSet mimeType="video/mp4" codecs="avc1.640828">
    <Role schemeIdUri="urn:mpeg:dash:stereoid:2013" id="d0"/>
    <Representation id="D1" bandwidth="28000">
        <SegmentList duration="10">
            <SegmentURL media="seg-m1-D1view-201.mp4"/>
            <SegmentURL media="seg-m1-D1view-202.mp4"/>
        </SegmentList>
    </Representation>
    <Representation id="D2" bandwidth="58000">
        <SegmentList duration="10">
            <SegmentURL media="seg-m1-D2view-201.mp4"/>
            <SegmentURL media="seg-m1-D2view-202.mp4"/>
        </SegmentList>
    </Representation>
</MPD>
```

Second Embodiment

The second embodiment supports two views. A texture tj of a first view depends on a texture t0 of a view 0. Depth information of a view depends on texture information of the same view. Depth information of each view is included in two representations. The following description relates to the second embodiment.

```
<MPD>
    <Period duration="PT1256.00S">
<SegmentList>
    <Initialization sourceURL="seg-m-init-2.mp4"/>
</SegmentList>
<!-- Below are two views?texture data -->
            <AdaptationSet mimeType="video/mp4"
                codecs="avc1.640828">
    <Role schemeIdUri="urn:mpeg:dash:stereoid:2013"
        value="r0" id="t0"/>
    <Representation id="C2" bandwidth="128000">
        <SegmentList duration="10">
            <SegmentURL
                media="seg-m1-C2view-201.mp4"/>
            <SegmentURL
                media="seg-m1-C2view-202.mp4"/>
        </SegmentList>
    </Representation>
</AdaptationSet>
<AdaptationSet mimeType="video/mp4" codecs="
    mvc1.760028">
    <Role schemeIdUri="urn:mpeg:dash:stereoid:2013"
        value="l0" id="t1"
        depend="t0"/>
    <Representation id="C1" bandwidth="192000">
        <SegmentList duration="10">
            <SegmentURL
                media="seg-m1-C1view-201.mp4"/>
            <SegmentURL
                media="seg-m1-C1view-202.mp4"/>
        </SegmentList>
    </Representation>
</AdaptationSet>
<!-And below are the depth data associated with the above view
textures -->
            <AdaptationSet mimeType="video/mp4"
                codecs="mvc1.640828">
    <Role schemeIdUri="urn:mpeg:dash:stereoid:2013"
        id="d0" depend="t0"/>
    <Representation id="D21" bandwidth="28000">
        <SegmentList duration="10">
            <SegmentURL
                media="seg-m1-D21view-201.mp4"/>
            <SegmentURL
                media="seg-m1-D21view-202.mp4"/>
        </SegmentList>
    </Representation>
    <Representation id="D22" bandwidth="58000">
        <SegmentList duration="10">
            <SegmentURL
                media="seg-m1-D22view-201.mp4"/>
            <SegmentURL
                media="seg-m1-D22view-202.mp4"/>
        </SegmentList>
    </Representation>
</AdaptationSet>
<AdaptationSet mimeType="video/mp4"
    codecs=" mvc1.760028">
    <Role schemeIdUri="urn:mpeg:dash:stereoid:2013"
        id="d1" depend="t1"/>
    <Representation id="D11" bandwidth="29000">
        <SegmentList duration="10">
            <SegmentURL
                media="seg-m1-D11view-201.mp4"/>
            <SegmentURL
                media="seg-m1-D11view-202.mp4"/>
        </SegmentList>
    </Representation>
    <Representation id="D12" bandwidth="59000">
        <SegmentList duration="10">
            <SegmentURL
                media="seg-m1-D12view-201.mp4"/>
            <SegmentURL
                media="seg-m1-D12view-202.mp4"/>
        </SegmentList>
    </Representation>
</AdaptationSet>
    </Period>
</MPD>
```

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of encoding three-dimensional (3D) content, the method comprising:
setting a dependency between texture information and depth information of the 3D content;
setting at least one representation for a texture information and depth information of each view;
setting an identifier parameter indicating information comprised in the representation; and
generating a bitstream comprising the dependency.

2. The method of claim 1, further comprising:
setting a relationship between a given view and the depth information and a dependency between the depth information and a texture information when the depth information is separate from the texture information.

3. The method of claim 1, wherein
when the identifier has a form of "ti", the representation comprises texture information of a view i,
when the identifier has a form of "di", the representation comprises depth information of the view i, an d
when the identifier has a form of "vi", the representation comprises the texture information and the depth information of the view i.

4. The method of claim 1, further comprising:
setting a dependency parameter indicating a relationship between a view associated with a current adaptive set and texture and depth information.

5. The method of claim 1, wherein the identifier parameter or the dependency parameter is added to a multi-view design of a role element of a moving picture experts group (MPEG) dynamic adaptive streaming over HTTP (DASH) standard.

6. The method of claim 1, wherein the dependency is set at a representation level or an adaptive set level.

7. A method of adaptive streaming service performed by a server, and the method comprising:
receiving a request for a media content from a client,
providing an the media content based on a media presentation description (MPD), characterized that:
wherein the MPD includes sequence of at least one period,
wherein the each period includes at least one adaptation set comprising media content component,
wherein the each adaptation set may include at least one representation,
wherein the each representation may include at least one sub-representation,
wherein the each representation may include at least one segment,
wherein an element of the media content component including (i) "Accessibility" element related to information about an accessibility scheme, (ii) "Role" element related to information about a role annotation scheme, (iii) "Rating" element related to information about a rating scheme, (iv) "Viewpoint" element related to information about a viewpoint annotation scheme.

8. The method of claim 7, wherein an element of the adaptation set comprising:
(i) ContentType attribute which is specified a media content component type of the adaptation set
(ii) par attribute which is specified a picture aspect ratio,
(iii) minBandWidth attribute which is specified a minimum bandwidth attribute value of all representations within the adaptation set,
(iv) maxBandWidth attribute which is specified a maximum bandwidth attribute value of all representations within then adaptation set,
(v) minWidth attribute which is specified a minimum width attribute value of all representations within an adaptation set,
(vi) maxWidth attribute which is specified a maximum width attribute value of all representations within the adaptation set,
(vii) minHeight attribute which is specified a minimum height attribute value of all representations within the adaptation set,
(viii) maxHeight attribute which is specified a maximum height attribute value of all representations within the adaptation set,
(ix) minFrameRate attribute which is specified a minimum frameRate attribute value of all representations within the adaptation set,
(x) maxFrameRate attribute which is specified a maximum frameRate attribute value of all representations within the adaptation set.

9. The method of claim 7, wherein the client switch from a single representation to another representation to adapt to a network condition within a single period.

10. The method of claim 7, wherein the media content is divided into segments over time within the representation.

11. The method of claim 7, wherein the media content component is referred to as a media stream,
wherein the media stream inherit an attribute of media content used for encoding media content.

* * * * *